US009216857B1

(12) United States Patent
Kalyan et al.

(10) Patent No.: US 9,216,857 B1
(45) Date of Patent: Dec. 22, 2015

(54) AUTOMATED INVENTORY MANAGEMENT SYSTEM

(71) Applicant: Amazon Technologies, Inc., Seattle, WA (US)

(72) Inventors: Atishkumar Kalyan, Seattle, WA (US); Steven Gregory Dunn, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/561,034

(22) Filed: Dec. 4, 2014

(51) Int. Cl.
*G06F 7/00* (2006.01)
*B65G 1/137* (2006.01)

(52) U.S. Cl.
CPC ...................................... *B65G 1/137* (2013.01)

(58) Field of Classification Search
None
See application file for complete search history.

(56) References Cited

U.S. PATENT DOCUMENTS

2014/0254896 A1* 9/2014 Zhou et al. .................... 382/124

* cited by examiner

*Primary Examiner* — Yolanda Cumbess
(74) *Attorney, Agent, or Firm* — Lee & Hayes, PLLC

(57) ABSTRACT

Some examples include an inventory system having both mobile drive units remotely controllable to transport inventory items and holders within a warehouse and automated aerial vehicles remotely controllable to identify and remove amnesty items from the storage region. In some implementations, the automated aerial vehicles are equipped with imaging components to monitor the floor of the warehouse to identify and engagement mechanisms to secure and remove the amnesty items that may otherwise impede the movement of the mobile drive units.

20 Claims, 10 Drawing Sheets

AUTOMATED INVENTORY MANAGEMENT SYSTEM

BACKGROUND

Modern inventory systems, such as those in mail-order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. For instance, in product distribution centers (e.g., fulfillment centers), vast quantities of products are processed for shipment to consumers traditionally using manual labor and/or mechanical handling equipment (e.g., conveyor systems, forklifts, etc.).

Inventory systems that are tasked with responding to large numbers of diverse inventory requests typically exhibit inefficient utilization of system resources, including space, equipment, and manpower. This may result in lower throughput, unacceptably long response times, an ever-increasing backlog of unfinished tasks, and generally poor system performance. Additionally, expanding or reducing the size or capabilities of many inventory systems requires significant changes to existing infrastructure and equipment. As a result, the cost of incremental changes to capacity or functionality may be prohibitively expensive, thereby limiting the ability of the system to accommodate fluctuations in system throughput.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
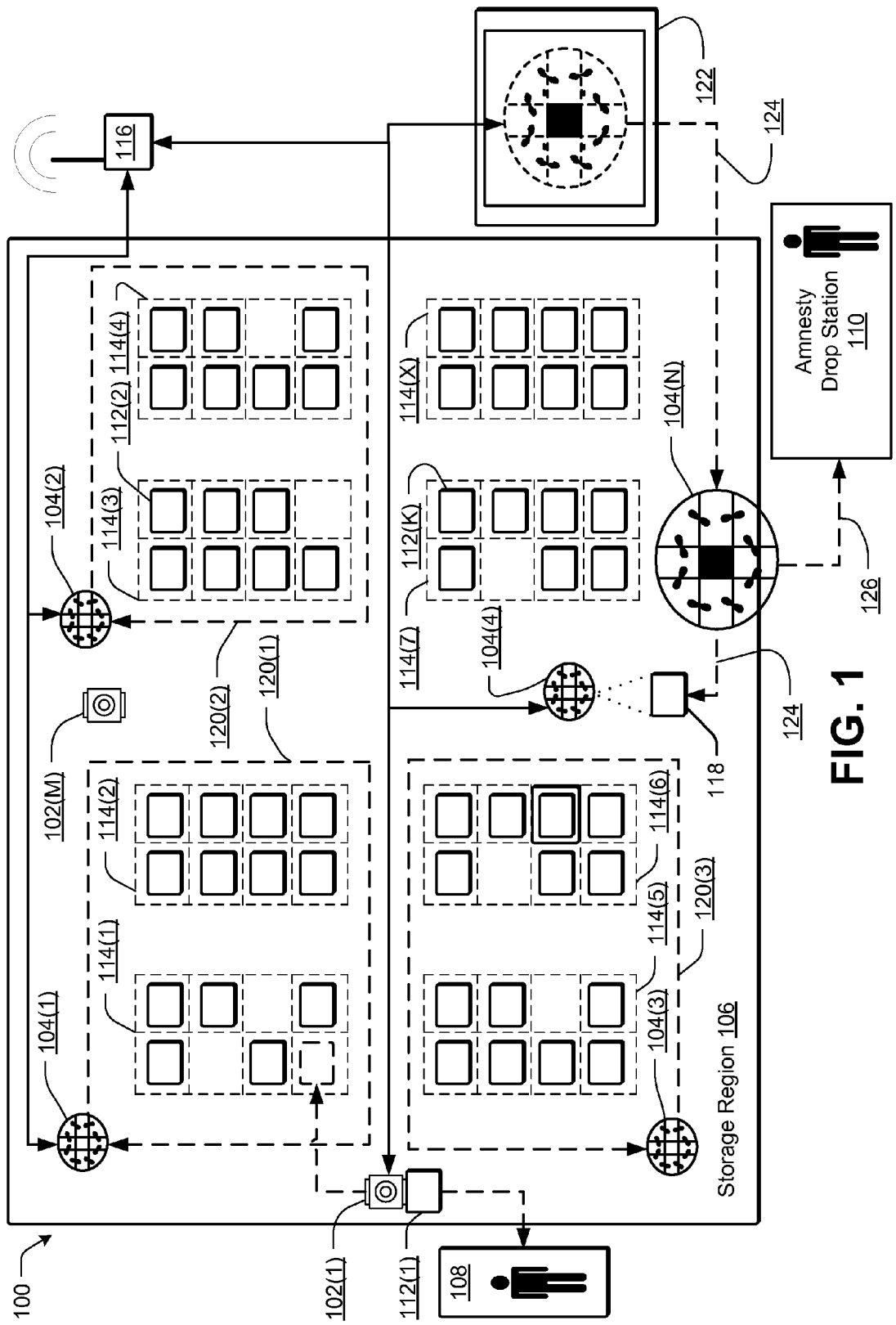
FIG. 1 illustrates an example inventory system having multiple regions, mobile drive units that carry inventory holders about the regions, and automated aerial vehicles to remove amnesty items from the regions.

Inventory systems are utilized by many entities for storing and managing inventory. For example, some retailers may utilize a warehouse of inventory holders that store inventory items in various bins. When an order for a specific inventory item needs to be filled by the retailer, a worker typically retrieves the inventory item from the bin where the inventory item is stored.

Inventory systems of the present disclosure utilize one or more mobile drive units (MDU) automatically to retrieve inventory holders from warehouse storage. The inventory holders may be entire racks of shelves, with each shelf having bins for various inventory items. MDUs may be self-powered robotic devices configured to move freely about the warehouse floor. Inventory holders may be transported by MDUs to an inventory station (e.g., a "pick station") for performing various inventory operations, such as packaging in a shipping container.

The ability for MDUs to transport inventory items to a station for performing inventory operations rather than or in addition to workers manually retrieving inventory items from stationary inventory holders or adding (e.g., replenishing) inventory items to stationary inventory holders may vastly increase efficiency and productivity of the inventory system. For example, by utilizing MDUs, an inventory system may be capable of fulfilling more orders per hour than previous solutions.

In some cases, fallen merchandise, inventory items, packaging material, or other items commonly found in a warehouse, generally referred to herein as "amnesty" items, may block or prevent the MDUs from transporting inventory items to and from the inventory stations. In some instances, the warehouse floor or a portion of the warehouse floor may be temporarily shut down to allow a worker to safely retrieve the amnesty item before allowing the MDUs to resume normal operations. Unfortunately, these periods of shut down may cause delays and other inefficiencies with respect to delivering packages and fulfilling orders. Therefore, in some implementations, described herein, one or more automated aerial vehicle (AAV) may be introduced into the warehouse, in addition to the MDUs on the floor to identify and remove the amenity items without the need to shut down the floor to ensure the safety of a worker. Additionally, it should be understood that while the term automated aerial vehicle (AAU) is used herein, a person having ordinary skill will understand that at times partial or complete human interaction and control of the AAVs may be necessary due to regulatory, logistical, or safety concerns without departing from the scope of the subject matter claimed herein.

In some implementations, one or more AAVs may be equipped with one or more imaging components, such as cameras or sensors, capable of distinguishing the MDUs and the inventory holders from amnesty items. In some cases, once the AAVs identify an amnesty item, the AAVs may be configured to notify the MDUs of a location within the warehouse associated with the amnesty item. In this case, the MDUs either may be rerouted avoid the location of the amnesty item and thereby continue to fulfill orders. Thus, the overall efficiency of the warehouse may be improved.

In some examples, the AAVs may also be equipped with one or more arms or engagement mechanisms for retrieving the amnesty item from the floor. For instance, the AAVs may include one or more arms with gripper claws for engaging and securing items, such as packaging materials. In other instances, the AAVs may be equipped with a vacuum device for suctioning fallen merchandise, such as a DVDs, and/or a padded bucket designed to pick up fallen merchandise, such as a stuffed animals or dolls.

In other examples, a first group of AAVs or one or more search AAVs may be equipped with the cameras and/or sensors for identifying the amnesty items, while a second group of AAVs or one or more retrieval AAVs may be equipped with the one or more arms or engagement mechanisms for retrieving the amnesty items. In this example, the search AAVs may be smaller than the retrieval group of AAVs, as the search AAVs are not configured to carry amnesty items. Thus, the search AAVs may be smaller and designed to stay aloft longer as less lift is required to keep the smaller AAVs airborne. Similarly, the retrieval AAVs may conserve power, as the retrieval AAVs may be airborne only when retrieving an amnesty item identified by the search AAVs.

In the current example, the search AAVs may be configured to track the movement of an identified amnesty item and to report the movement to the MDUs, while waiting for a retrieval AAV to remove the amnesty item. For example, the amnesty item may be a package or shipping material that blows around the warehouse floor as the MDUs drive by or as the air-conditioning units cool the warehouse.

In still other examples, the first group or search AAVs may be replaced and/or supplemented by fixed cameras or sensors physically attached the warehouse ceiling. For example, a group of fixed cameras may be utilized to identify an amnesty item and to notify a retrieval AAV of the location of the amnesty item, such that the retrieval AAV may retrieve the item from the floor. In this example, search AAVs may be used to track amnesty item or identify amnesty items at locations not readily viewable from the ceiling of the warehouse or other fixed location.

In some instances, the AAVs and the MDUs may be controlled by a central management module or server. For instance, the management module may be in wireless communication with each of the AAVs and each of the MDUs to direct the movement of each device and provide instructions related to orders received and amnesty items retrieved. In one example, a management module may identify an order for a particular item placed by a customer and notify one of the MDUs to transport a particular inventor holder containing the particular item to an inventory station for packaging. In another example, the management module may receive a notification that one of the smaller AAVs identified an amnesty item. For instance, the management module may receive images from the AAV and process the images to identify a type associated with the amnesty item (e.g., large merchandise, medium merchandise, small merchandise, packaging material, broken merchandise, etc.). Then based at least in part on the type of amnesty item identified, the management module may activate one of the larger AAVs to receive the item and to return the amnesty item to a drop area for processing by a worker.

In some implementations, AAVs may also be configured to identify, engage, move, and/or deliver to customer ready to ship packages. For example, once merchandise is packaged, the package merchandise may have a bar code or QR code applied to a top surface of the package by either an operator or one or more other types of robotic units, such as a picker or labeler unit. In this example, the AAVs may detect, via one or more cameras or sensors, the presence of the bar code or QR code on the top surface of the package as an indication that the package is ready for delivery. The AAV may align itself with the package based at least in part on the position of the bar code or QR code. For instance, the AAV may identify the package with the bar code and center itself over the bar code or QR code, thus centering the AAV over the package. The AAV may then attempt to identify the edge of the package and utilize one or more engagement mechanisms to secure the package to the AAV for delivery.

In some implementations, the package may be a predefined size or place in a predefined shipping container. In these implementations, when the AAV aligns itself with the bar code or QR code, the shipping containers may be designed to lock into place (for example, via a magnetic or mechanical coupling). Thus, in these implementations, the AAVs may be configured with lighter or less versatile engagement mechanisms, thereby reducing the number of moving parts and improving reliability of the each AAV.

In some cases, the AAVs may be able to scan the bar code or QR code before or after securing the package to determine a delivery location and/or relay location. For example, the AAVs may be rated for different distance and configured to scan the bar code or QR code to determine a delivery location and distance associated with the package before assigning itself to the package. In this way, different sized AAVs may be utilized to facilitate the delivery of different sized packages and/or different delivery distances.

In some examples, one or more picker units may be configured to receive a package or shipping containers ready for delivery from one or more of the MDUs and to place the package or shipping containers on a conveyor belt or into other designated pickup areas. In some cases, the picker unit may be configured to call or alert an unassigned AAV to the presence of a ready to ship package within the pickup area. In other cases, the picker unit may be configured to notify the management module of the ready to ship package and the management module may select and assign an AAV to deliver the package. In still other cases, one or more sensors, such as a pressure plate, may be located at pickup areas located at each of multiple ends of conveyor belt and configure to provide an alert to the management module when a package is detected by the sensor (e.g., in this example, when a package depresses the pressure plate).

In one particular example, the AAVs may be configured to scan the conveyor belt for packages with bar codes or QR codes and to retrieve the packages from the moving conveyor belt or from other designated areas, such as one or more pickup areas. Additional examples related to operating an inventory system are described below. The techniques discussed herein may be implemented in many different ways, by many different systems. Various representative implementations are provided below with reference to the figures.

FIG. 1 illustrates an example inventory system 100 having multiple regions, mobile drive units, generally represented by MDUs 102(1)-(M), that carry inventory holders about the regions, and automated aerial vehicles 104(1)-(N) to remove amnesty items from the regions. In FIG. 1, one or more inventory operations (e.g., user-directed replenishment operations) that may otherwise utilize physical identifiers, such as bar codes associated with various inventory storage locations on an inventory holder, may be automatically tracked via an inventory tracking device, such as a three-dimensional (3D) imaging camera.

The inventory system 100 of FIG. 1 may be arranged in a facility or warehouse (e.g., distribution facility, fulfillment center, etc.) that is logically organized into areas or regions associated with various functions. In the illustrated example, the warehouse includes a storage region 106, an inventory station 108, and an amnesty drop stations 110. In practice, depending upon the size of the inventory system 100, the warehouse may hold more than one of the storage regions 106, one or more inventory stations 108, and one or more drop stations 110.

In general, the storage region 106 is designated for storing items and/or merchandise in inventory holders 112(1)-(K) arranged in multiple predefined storage locations 114(1)-(X).

The inventory station 108 represents a location designated for the removal of inventory items from inventory holders 112(1)-(K), the introduction of inventory items into inventory holders 112(1)-(K), the counting of inventory items in inventory holders 112(1)-(K), and/or the processing or handling of inventory items to or from inventory holders 112(1)-(K) in any other suitable manner. The amnesty drop station 110 represents a location designated for the processing amnesty items misplaced in and retrieved form the storage region 106. In some cases, the amnesty items may be returned to the amnesty drop station 110 by AAV 104(N), the amnesty item may be processed by an operator or worker, and then provided to the inventory station 108 or placing back into an appropriate inventory holder 112(1)-(K).

In some instances, the MDUs 102(1)-(M) and the AAVs 104(1)-(N) may be controlled by a central management module or server, generally indicated by 116. For instance, the management module 116 may be in wireless communication with each of the MDUs 102(1)-(M) and each of the AAVs 104(1)-(N) to send and receive information and instructions to each of the units. In some cases, the management module 116 may utilize the information received to direct the movement of each of the MDUs 102(1)-(M) with regard to transporting inventory holders 112(1)-(K) to and from the storage region 106 and the packing station 108. Similarly, the management module 116 may also utilize the information received to direct the movement of each of the AAVs 104(1)-(N) with regard to monitoring the storage region 106 and retrieving amnesty items, such as amnesty item 118, from the storage region 106.

In the illustrated example, two MDUs 102(1) and 102(M) are shown, five AAVs 104(1)-(N), and some of the inventory holders 112(1)-(K). However, it should be understood that a warehouse may implement any number of MDUs, AAVs, and inventory holders. Further, in some implementations, an operator or worker may perform one or more inventory management tasks (e.g., item picking or item replenishment) at the inventory station 108 and the amnesty drop station 110.

In the example of FIG. 1, each of the inventory holders 112(1)-(K) includes multiple inventory items (not shown), and an inventory tracking device (not shown) may be configured to track movement of the inventory items as the inventory items are added and removed from the inventory holders 112(1)-(K) at the inventory station 104. For example, MDU 102(1) may be transporting inventory holder 112(1) to an operator or worker at inventory station 108. The operator or worker may then add one or more items to the inventory holder 112(1) as part of a replenishment operation or remove one or more items from the inventory holder 112(1) as part of a picking operation.

In some implementations, one or more MDUs 102(1)-(M) are provided in the storage region 106 to transport the inventory holders 112(1)-(K) between the storage region 106 and other regions of the inventory system 100 (e.g., in a warehouse or a manufacturing facility), such as the inventory station 108 and the amnesty drop station 110. For instance, in the example illustrated, a loaded MDU 102(1) is shown in the storage area 106 carrying an inventory holder 112(1) to inventory station 108. An unloaded MDU 102(M) is also shown moving through the aisles of the storage region 106 between two predefined storage locations 118(2) and 118(3).

In other implementations, one or more AAVs 104(1)-(4) may be provided in the storage region 106 to monitor the floor of the storage region for amnesty items 118 (e.g., one or more fallen inventory items, packaging materials, or other debris). For instance, in the illustrated example, the AAV 104(4) has identified amnesty item 118 on the floor of the storage region 106. In some cases, the AAV 104(4) upon detecting the amnesty item 118 may attempt to retrieve the amnesty item 118 and deliver the amnesty item 118 to the amnesty drop station 110 for processing by an operator or worker.

In other cases, the AAV 104(4) may provide a notification or alert to the management module 116 to notify the management module 116 of the location of the amnesty item 118. In some instances, the notification or alter may include images captured of the amnesty item 118, a location or area within the storage region 106 that the amnesty item 118 was detected (such as the nearest predefined storage locations 114(1)-(X)), and/or an identification of the amnesty item (e.g., a DVD, a stuffed animal, a watch, etc.).

For instance, the AAVs 104(1)-(N) may include several classes or types of AAVs equipped to carry out different functions regarding the detection and removal of amnesty items 118 from the storage region 106. For instance, in the illustrated example, the AAVs 104(1)-(4) may be a first class or smaller AAVs equipped with one or more imaging components for detecting amnesty items, such as amnesty item 118. In some cases, each of the smaller AAVs 104(1)-(4) may be assigned to monitor an area of the storage region 106 for amnesty items. Thus, in the illustrated example, AAV 104(1) monitors a first area of the storage region 106, generally indicated by flight path 120(1). The AAV 104(2) monitors a second area of the storage region 106, generally indicated by flight path 120(2). The AAV 104(3) monitors a third area of the storage region 106, generally indicated by flight path 120(3). The AAV 104(4) also monitors a fourth area of the storage region 106. However, in the illustrated example the AAV 104(4) has temporarily deviated from its flight path upon detection of the amnesty item 118. In this manner, the AAV 104(4) may track the movement and/or location of the amnesty item 118 until the amnesty item 118 is removed from the floor of the warehouse.

Additionally, the AAVs 104(1)-(N) may include a second class or larger AAVs, such as AAV 104(N). The larger AAV 104(N) may be equipped with one or more gripper arms or other engagement mechanisms to retrieve the amnesty item 118 from the storage region. In this manner, the smaller AAVs 104(1)-(4) may be lighter, cheaper, and capable of staying aloft longer than if the AAVs 104(1)-(4) were also designed to carry amnesty items to the amnesty drop station 110.

Thus, in the example illustrated in FIG. 1, the management module 116 has dispatched the larger AAV 104(N) that may be equipped with one or more gripper arms or other types of engagement mechanisms to retrieve the amnesty item 118 spotted by AAV 104(4) from the floor. For instance, the AAV 104(N) is shown in route from the waiting area or recharge station 122 to the amnesty item 118 as shown by path 124. Once the amnesty item 118 is secured, the AAV 104(N) transports the amnesty item 118 to the amnesty drop station 110, as illustrated by path 126.

In some implementations, the AAV 104(4) may also be configure to provide an alert to the MDUs 102(1)-(K) to notify the MDUs 103(1)-(K) of the presence of the amnesty item 118 on the floor of the storage region 106. Thus, the MDUs 102(1)-(K) may avoid the amnesty item 118 and/or the area around the amnesty item 118 as to prevent the MDUs 102(1)-(K) from interrupting the removal of the amnesty item 118 from the floor and/or from running over or becoming caught on the amnesty item 118. In other implementations, the alert may be provided to the MDUs 102(1)-(K) from the management module 116 in response to the management module 116 receiving the notification from the AAV 104(4). In these implementations, the management module 116 may issue additional instructions to the MDUs 102(1)-(K) to keep the inventory system 100 operational, while the amnesty item 118 is removed from the storage region 106. For example, by assigning MDUs 102(1)-(K) to fill orders for items stored in the predefined storage locations 114(1)-(5) away from the location of the amnesty item 118.

In some implementations, the inventory station 108 and the amnesty drop station 110 may be combined at the same location. For example, the AAV 104(N) may be configured to transport the amnesty item 118 to the nearest inventory station 108 for processing. For instance, the AAV 104(N) may drop the amnesty item 118 at the inventory station 108 and an operator or a worker may identify the item as a particular DVD. The operator may then cause one or more MDUs 102(1)-(M) to retrieve inventory holders 112(1)-(K) that house the particular DVD. The operator may count the number of DVDs in each inventory holder to determine if the inventory holder 112(1)-(K) is short. Upon determining, that an inventory holder 112(1)-(K) is short, the operator may deposit the amnesty item 118 into the inventory holder 112 (1)-(K) and return to normal operations (e.g., fulfilling orders and packaging items for shipment to customers).

Further, while "inventory station" and "amnesty drop station" are used to refer to locations at which any appropriate processing operation supported by inventory system 100 may be completed, particular embodiments of inventory system 100 may include specialized inventory stations suitable for performing only a single processing task supported by inventory system 100. For example, a particular inventory station 104 may be capable of handling only retrieval requests or only replenishment requests, as defined below. Moreover, a particular embodiment of inventory system 100 may include inventory stations that are, in general, capable of handling multiple types of inventory requests but, at any given time, configured to handle only one particular type of inventory requests.

Figure 2:
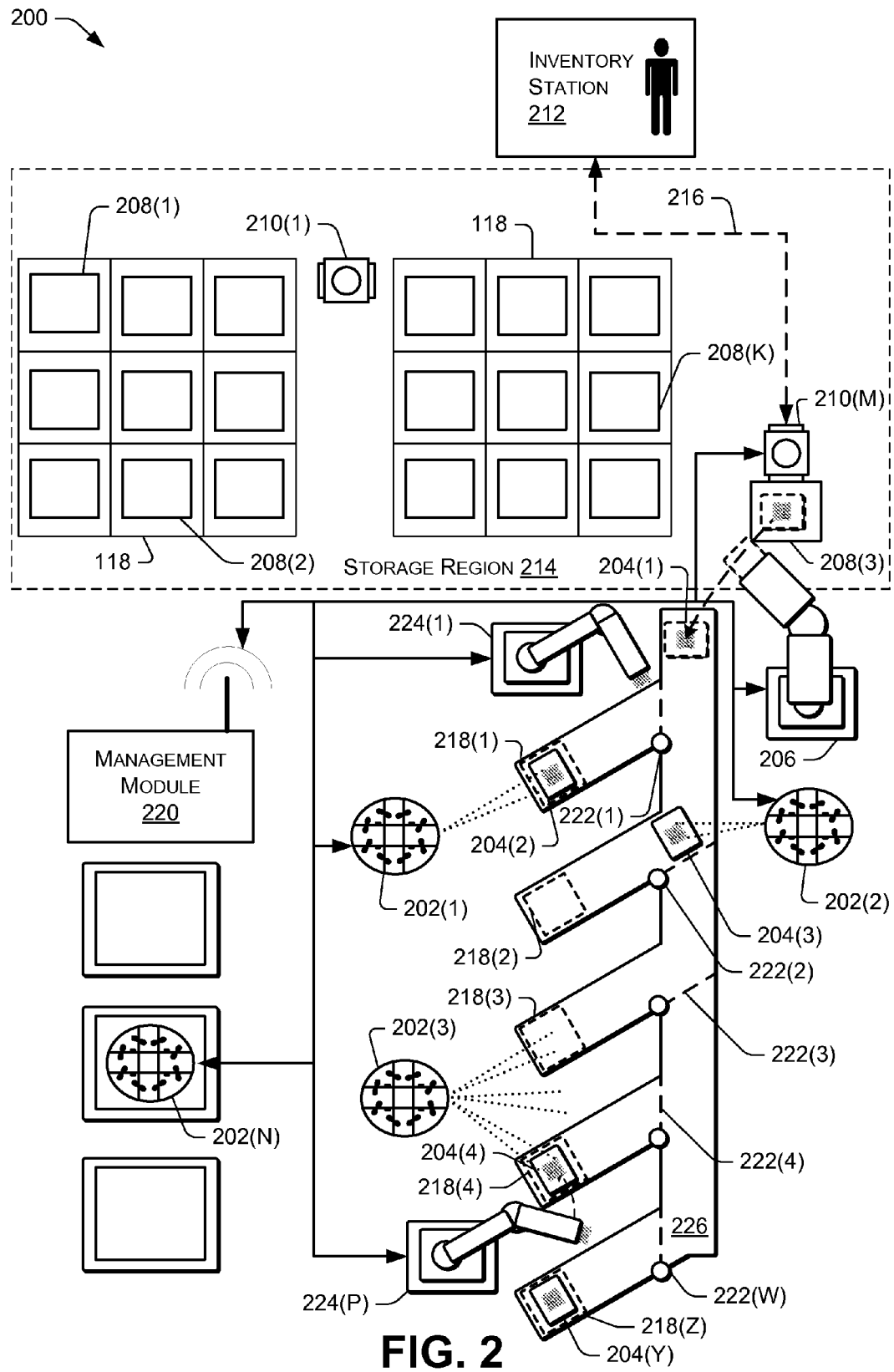
FIG. 2 illustrates an example inventory system utilizing automated aerial vehicles to aid in the delivery of ready to ship packages.

FIG. 2 illustrates an example inventory system 200 utilizing AAVs 202(1)-(N) to aid in the delivery of ready to ship packages 204(1)-(Y). In FIG. 2, the AAVs 202(1)-(N) may be equipped with both imaging components (such as cameras and/or sensors) to detect the ready to ship packages 204(1)-(Y) and gripping arms or other engagement mechanisms to secure the ready to ship packages 204(1)-(Y) during transit. For example, the AAVs 204(1)-(Y) may be equipped with cameras capable of detecting a packed shipping container and/or one or more bar code or QR code scanners capable of identifying and reading bar codes and/or OR codes placed on top of the ready to ship packages 204(1)-(Y). The AAVS 202(1)-(N) may also be equipped with a mechanical, electrical, or magnetic securing device configured to attach, engage, or lock into place when the AAV 202(1)-(N) is positioned over the packages 204(1)-(Y). For instance, a ready-to-ship package 204(1)-(Y) may be placed in a delivery container or AAV container that is configured to magnetically secure to the underside of the AAV 202(1)-(N) and to release the package 204(1)-(Y) at the delivery site. In one such embodiment, such container may include a ferromagnetic feature that may be selectively engaged and disengaged from an AAV 202 through the electrical activation and deactivation of an electromagnet carried thereon.

The inventory system 200 also includes a picker unit 206 for placing the ready to ship packages 204(1)-(Y) delivered by MDUs 210(1)-(M) onto one more conveyor belts 226. For instance, in the illustrated example, the MDU 210(M) is shown transporting the ready to ship package 204(1) from an inventory station 212 through storage region 214 along path 216. The picker unit 206 removes the package 204(1) from the inventory holder 208(3) and places the package 204(1) onto the conveyor belt 226.

In some cases, the picker unit 206 may be a robotic arm or other robotic unit design to identify ready to ship packages 204(1)-(Y) based either on a location within the inventory holder 208(3) or by scanning the individual shelves of the inventory holder 208(3) for bar codes or QR codes indicting the ready packages 204(1)-(Y) within the inventory holder 208(3). In some cases, the picker unit 206 may be equipped with a mechanical grasping device such as a mechanical hand, while in other implementations the picker unit 206 may include a suction or vacuum device for lifting the packages 204(1)-(Y). In some implementations, the picker unit 206 may include or be a human operator.

In some implementations, the conveyor belt 226 may include a one or more pickup areas, generally indicated by 218(1)-(Z). For example, the conveyor belt 226 may direct the ready to ship packages 204(1)-(Y) down various paths of the conveyor belt 226 to deposit each package 204(1)-(Y) at one of the designated pickup areas 218(1)-(Z). For instance, in the example of FIG. 2, the package 204(2) has arrived at pickup area 218(1) and the AAV 202(1) has been dispatched to deliver the package 204(2). In general, the AAV 202(1) is able to scan the bar code or QR code on top of the package 204(2) to both align the AAV 202(1) with the package 204(2) before securing the package 204(2) for delivery and to determine a delivery location. In some cases, a management module 220 may be in wireless communication with the picker unit 206, the AAVs 202(1)-(N), and/or the conveyor belt 226. In these cases, the management module 220 may receive communication from the picker unit 206 that the ready to ship package 204(1) has been placed on the conveyor belt 226 and is ready for shipment. The management module 220 may assign one of the AAVs 202(1)-(N) to deliver the package 204(1). For instance, in the illustrated example, AAVs 202(1) and has been assigned to deliver package 204(1), while AAV 202(N) is still waiting for an assignment.

In other instances, each of the pickup areas 218(1)-(Z) may be equipped with a sensor (such as a pressure plate) in communication with the management module 220. For example, in FIG. 2, the sensor associated with pickup area 218(1) may detect a presence of the package 204(1) and notify the management module 220. The management module 220 may then assign the AAV 202(1) to deliver the package 204(2) located in pickup area 218(1). In some implementations, the pressure plate or other sensor of each pickup area 218(1)-(Z) may also be configured to control a corresponding portion of the conveyor belt 226, as well as a corresponding gate or package director 222(1)-W) to control the flow of package 204(1)-(Y) into each of the pickup areas 218(1)-(Z).

In the illustrated example, the packages 204(1)-(Y) each have a QR code or bar code located near the top center of the package 204(1)-(Y). In some instances, the QR code may be applied by an operator or worker at the inventory station 212. In other instances, one or more label units, such as label units 224(1)-(P) may be arranged with regard to the conveyor belt 226 to apply the QR code or bar code once the package 204(1)-(Y) arrives at the designated pickup area 218(1)-(Z). In the illustrated example, the label unit 224(P) has applied a QR code to package 204(Y) and is in the process of applying a QR code to package 204(4). In some implementations, the picker unit 224(P) may receive delivery information from the management module 220 and print the QR codes or bar codes representative of the delivery information onto a top surface of each package 204(1)-(Y).

In some implementations, particular AAVs 202(1)-(N) may be assigned to one or more pickup areas 218(1)-(Z), such that the AAV 202(1)-(N) delivers a package 204(1)-(Y) when it arrives within one of the assigned pickup areas 218(1)-(Z). For instance, in the illustrated example, the AAV 202(3) is shown as assigned to pick up areas 218(3) and 218(4). Thus, the AAV 202(3) is scanning back and forth using a camera or other scanner for the presence of a package 204(1)-(Y) within the pickup areas 218(3) and 218(4).

In other implementations, the AAVs 202(1)-(N) may be configured to locate and pickup any package 204(1)-(Y) located on the conveyor belt 226. For instance, FIG. 2 illustrates, the AAV 202(2) locating the package 204(3) as the package 204(3) is moving along the length of the conveyor belt 226. In this example, when the AAV 202(2) detects the bar code or QR code atop the package 204(3) the AAV 202(2) may align itself with the QR code, match the movement speed of the conveyor belt 226, and secure the package 204(3) for delivery to a customer or relay location.

In some particular implementations, the AAVs 202(1)-(N) may be configured to locate and pickup packages being transported by the MDUs 210(1)-(M). For instance, FIG. 2 illustrates, the AAV 202(4) locating the package 204(1) on the inventory holder 208(3) being delivered by the MDU 210(M). In this example, the AAV 202(4) may detect the bar code or QR code atop the package 204(1). The AAV 202(4) may then align itself with the QR code, match the movement speed of the MDU 210(M) and secure the package 204(1) for delivery to a customer or relay location prior to the MDU 210(M) delivering the package to the picker unit 206.

Figure 3:
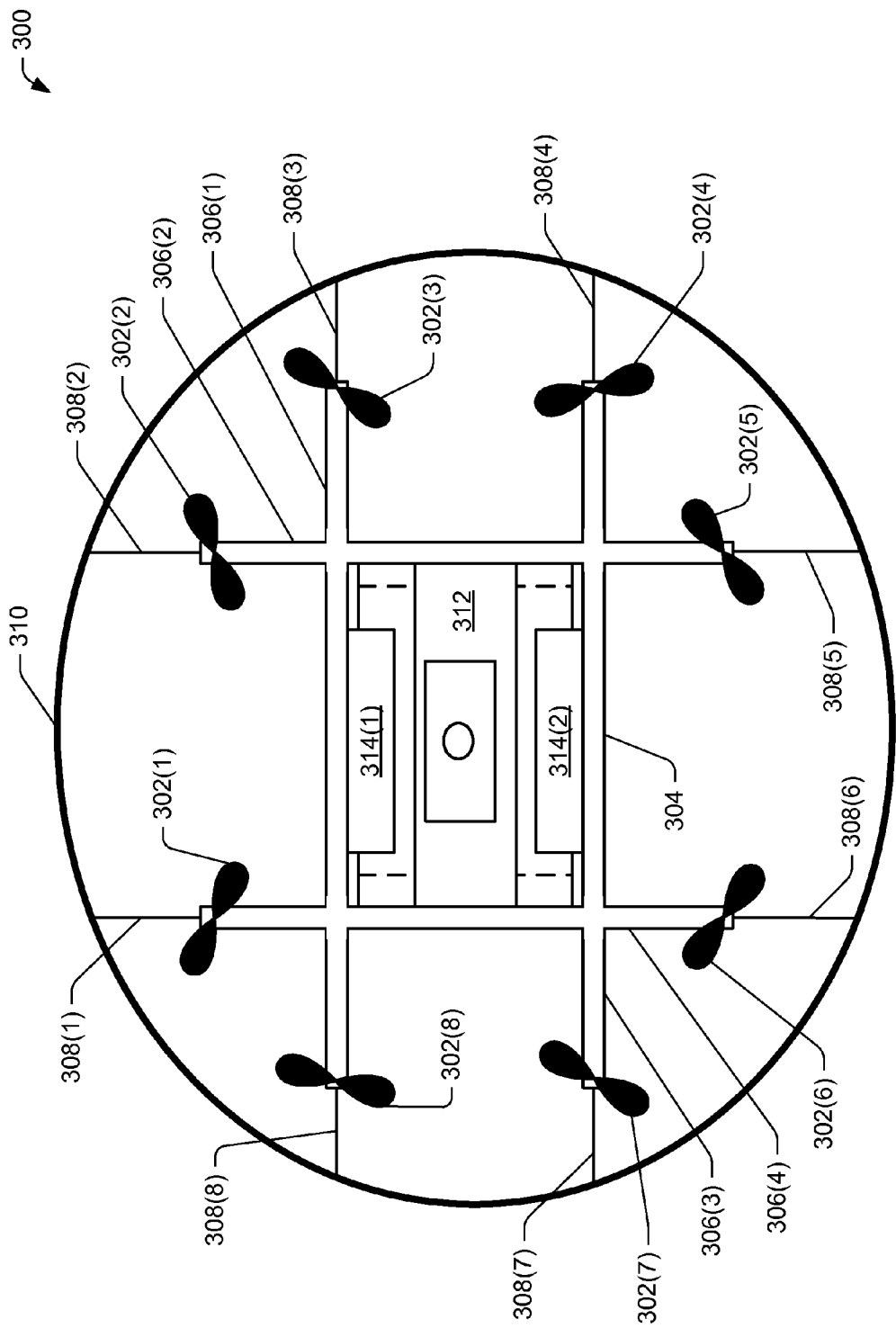
FIG. 3 is a top view of an example automated aerial vehicle used in the inventory system of FIGS. 1 and 2.

FIG. 3 is a top view of an example AAV used in the inventory system of FIGS. 1 and 2. As illustrated, the AAV 300 includes eight propellers 302(1), 302(2), 302(3), 302(4), 302(5), 302(6), 302(7), and 302(8) (also called rotors) spaced about a frame 304 of the AAV. The propellers 302(1)-(8) may be any form of propeller (e.g., graphite, carbon fiber) and of a size sufficient to lift the AAV 300 and any payload (such as inventory, amnesty items, shipping packages, or visual equipment) carried by the AAV 300. While the illustrated example includes eight propellers, in other implementations, more or fewer propellers may be utilized based at least in part on the size and functionality of each individual AAV. For example, the smaller AAVs used to detect amnesty items, such as AAV 104(1) and 104(2) of FIG. 1, may have fewer or smaller propellers than the larger AAVs for removing the amnesty items, such as AAV 104(N) of FIG. 1. Likewise, in some implementations, the propellers may be positioned at different locations on the AAV 300. In addition, alternative methods of upward and/or forward propulsion may be utilized. For example, in some implementations, fans, jets, turbojets, turbo fans, jet engines, and the like may be used to propel the AAV 300.

The frame 304 or body of the AAV 300 may likewise be of any suitable material, such as graphite, carbon fiber, plastic, composite, and/or aluminum. In the illustrated example, the frame 304 of the AAV 300 includes four structures 306(1), 306(2), 306(3), and 306(4) arranged in a hash pattern with the structures intersecting and joined at approximately perpendicular angles. However, more or fewer structures 306(1)-(4) may be included in the AAV 300. For example, the AAV 300 may include two structures that intersect at or near a midpoint of each structure. The structures may be rigid or substantially rigid to allow minimal flex during operation of the AAV 300. The structures may include a circular, oval, square, or polynomial cross section in some embodiments. The structures may be linear or non-linear (e.g., curved or partially curved). However, the structures 306(1)-(4) may be formed as open structures such as U-beams, I-beams, and fins.

While the AAV 300 includes four structures 306(1)-(4) that are joined to form the frame 304, in other implementations, there may be fewer or more components to the frame 304. Although the structures 306(1)-(4) are shown as being straight or linear structures, the structures may include some curvature in some embodiments. The structures may be coupled to one another at other angles besides ninety degrees to position and/or support the propellers 102 as discussed herein.

In some implementations, the AAV 300 may be configured for aerodynamics, for instance, when the AAV 300 is used for delivering ready to ship packages outside of the warehouse. For example, an aerodynamic housing may be included on the AAV 300 that encloses an AAV control system, the frame 304 and/or other components of the AAV 300. The housing may be made of any suitable material(s) such as graphite, carbon fiber, plastic, composite, aluminum, etc. Likewise, in some implementations, the location and/or the shape of the inventory (e.g., item or container) may be aerodynamically designed. For example, in some implementations, the gripper arms or engagement mechanisms may be configured such that, when the amnesty item or ready to ship package is secured, the inventory is enclosed within the frame and/or housing of the AAV 300 so that no additional drag is created during transport of the inventory by the AAV 300. In other implementations, the shipping containers may be shaped to reduce drag and provide a more aerodynamic design of the AAV 300 when delivery packages to customers. For example, if the shipping container extends below the AAV 300 when engaged, the exposed portion of the container may have a curved shape to reduce drag.

Each of the propellers 302(1)-(8) may correspond to a designated propeller motor positioned the ends of each structure 306(1)-(8). For inventory transport purposes, the propeller motors may be any form of motor capable of generating enough speed with the propellers to lift the AAV 300 and any engaged items thereby enabling aerial transport of the items. The propeller motors may be any form of motor (e.g., permanent magnet, brushless, etc.).

Extending outward from each end of the frame 304 is a support arm 308(1)-(8) that is connected to a barrier 310. In this example, the barrier 301 is positioned around and attached to the AAV 300 in such a manner that the motors and propellers 302(1)-(8) are within the perimeter of the barrier 310. The barrier 310 may be plastic, rubber, etc. Likewise, depending on the length of the support arms 308(1)-(8) and/or the length, number or positioning of the frame 304, the barrier 310 may be round, oval, or any other shape. In some embodiments, multiple barriers may be used, such as placement of a barrier 310 around each propeller 302(1)-(8) or some groups of the propellers. The barriers may protect the propellers from damage and/or protect other objects from damage by preventing the propellers from engaging other objects.

Mounted to the frame 304 is an AAV control system 312. In this example, the AAV control system 312 is mounted centrally and on top of the frame 304. In general, the AAV control system 312 controls the operation, routing, navigation, communication, ballast movement, and the gripper arms and/or engagement mechanisms of the AAV 300. For instance, in one example, the AAV control system 312 may include one or more processors coupled to a non-transitory computer readable storage medium. The AAV control system 312 may also include a propeller motor controller, power supply module, and/or a navigation system. The AAV control system 312 may further include an engagement mechanism controller, a ballast controller, a network interface, and one or more input/output devices.

In some implementations, the non-transitory computer readable storage medium may be configured to store executable instructions, data, flight paths, and/or data items accessible by the processor(s). In various implementations, the non-transitory computer readable storage medium may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium as program instructions, data storage and flight path data, respectively. In other implementations, program instructions, data and/or flight paths may be received, sent or stored upon different types of computer-accessible media, such as non-transitory media, or on similar media separate from the non-transitory computer readable storage medium or the AAV control system. Generally speaking, a non-transitory, computer readable storage medium may include storage media or memory media such as flash memory (e.g., solid state memory), magnetic or optical media (e.g., disk) coupled to the AAV control system 312 via the I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface.

In some cases, the propeller motor(s) controller may communicate with the navigation system and adjusts the power of each propeller motor to guide the AAV 300 along a determined flight path. The power supply module may control the charging and any switching functions associated with one or more power modules (e.g., batteries) of the AAV 300, such the power.

The navigation system may include a GPS or other similar system that can be used to navigate the AAV 300 to and/or from a location. The engagement mechanism controller may communicate with the actuator(s) or motor(s) (e.g., a servo motor) used to engage and/or disengage the amnesty items or packages. For example, when the AAV 300 aligns and positions itself over a ready to ship package based at least in part on the location of the bar code or QR code, the engagement mechanism controller may provide an instruction to a motor that controls the engagement mechanism to engage or secure the package to the frame 304.

The network interface may be configured to allow data to be exchanged between the AAV control system 300, other devices attached to a network, such as a management module, such as management modules 116 of FIG. 1 and management module 220 of FIG. 2, and/or with other AAVs. For example, the network interface may enable wireless communication between numerous AAVs, MDUs, and/or the management module. In various implementations, the network interface may support communication via wireless general data networks, such as a Wi-Fi network. For example, the network interface may support communication via telecommunications networks such as cellular communication networks, satellite networks, and the like.

In particular, the computing system and devices may include any combination of hardware or software that can perform the indicated functions, including computers, network devices, internet appliances, PDAs, wireless phones, pagers, etc. The AAV control system 312 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The AAV 100 includes one or more power modules 314. In this example, the AAV 300 includes two power modules 314(1) and 314(2) that may be removably mounted to the frame 304. The power module for the AAV 300 may be in the form of battery power, solar power, gas power, super capacitor, fuel cell, alternative power generation source, or a combination thereof. For example, the power modules 314(1) and 314(2) may each be a 6000 mAh lithium-ion polymer battery, polymer lithium ion (Li-poly, Li-Pol, LiPo, LIP, PLI or Lip) battery. The power module(s) 314(1) and 314(2) may be coupled to and provide power for the AAV control system 312, as well as the propeller motors.

While the implementations of the AAV discussed herein utilize propellers 302(1)-(8) to achieve and maintain flight, in other implementations, the AAV may be configured in other manners. For example, the AAV 300 may include fixed wings and/or a combination of both propellers and fixed. For example, the AAV 300 may utilize one or more propellers to enable takeoff and landing and a fixed wing configuration or a combination wing and propeller configuration to sustain forward flight while the AAV 300 is airborne.

Figure 4:
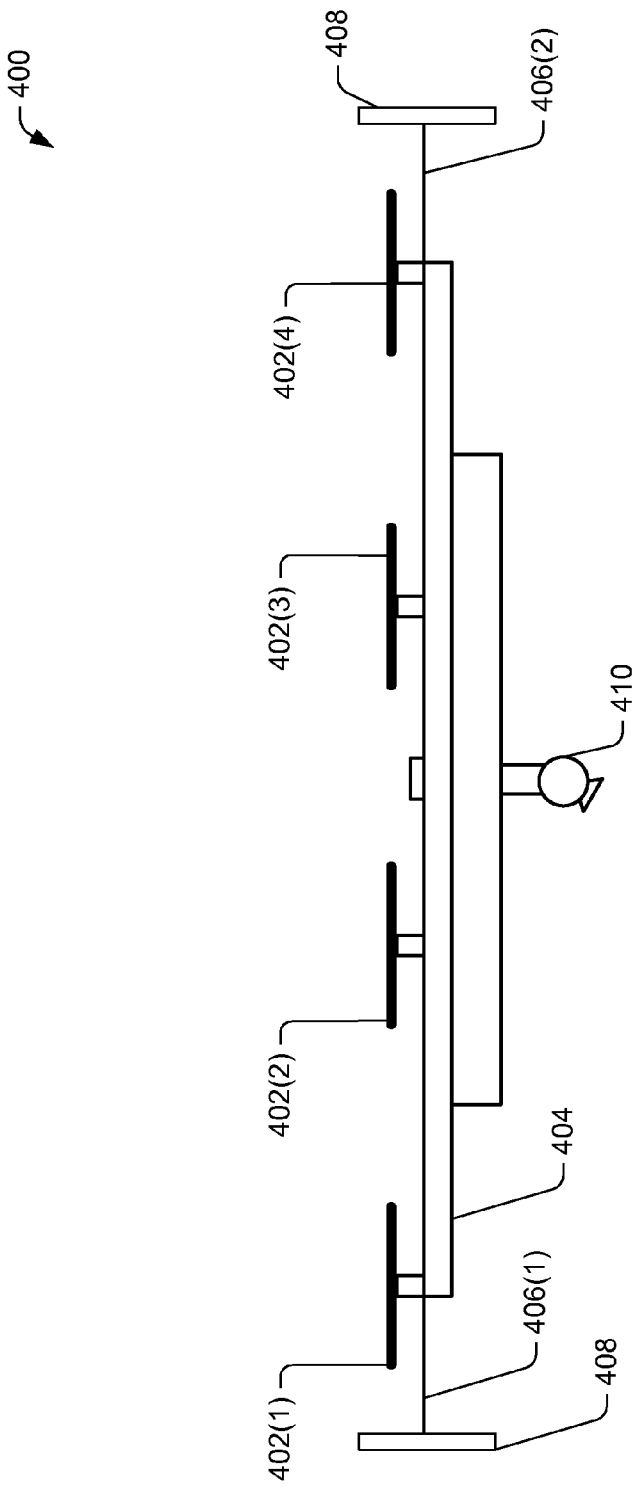
FIG. 4 is a side view of an example automated aerial vehicle used in the inventory system of FIG. 1.

FIG. 4 is a side view of an example AAV 400 used in the inventory system 100 of FIG. 1. In this example, the AAV 400, such as AAVs 104(1) and 104(2) of FIG. 1, used to monitor the warehouse floor for the presence of amnesty items. In this example, the AAV 400 may be a smaller AAV that may maintain a longer period of flight than other AAVs used to remove the amnesty items once detected. Thus, the AAV 400 is illustrated including four propellers 402(1), 402(2), 402(3), and 402(4) attached to the frame 404. Additionally, support arms 406(1) and 406(2) extend from the frame 404 at one end and connected to a barrier 408 at the other, as described above with respect to FIG. 3.

In the illustrated example, the AAV 400 also includes an imaging component 410 mounted below the frame 404. In some cases, the camera may be one or more three-dimensional cameras, depth cameras, motion or movement sensors, among others. For example, the imaging component 410 may be configured to image a scene or area of the warehouse floor in the visible light wavelengths, non-visible light wavelengths, or both. In some cases, the imaging component 410 may have a field of view that may be fixed, while in other cases the field of view may be movable and/or zoomable.

In some cases, a plurality of imaging component 410 may be used to monitor the warehouse floor. For example, the AAV 400 may include a three-dimensional camera, an infrared camera, and/or a red-green-blue camera. In one example, the three-dimensional and infrared camera may be configured to capture information related to depths, location, and movement of objects within the field of view. The red-green-blue camera may be configured to detect edges of objects by identifying changes in color within the field of view. In some cases, the AAV 400 may also include additional imaging components 410 for tracking the movement of amnesty items within the field of view. For example, the AAV may include one or more motion sensors.

In some implementations, the AAV control system may include processing instructions and/or an image processor capable of receiving image data form the one or more imagining components 410 and processing the image data to detect unexpected or amnesty items within the field of view. In some instances, the AAV control system may also receive information related to the movement of the MDUs on the floor from the management system to aid in the detection of the amnesty items. In other implementations, the AAV 400 may provide, via one or more wireless communication channels, the image data to the management modules, which may process the image data to identify the amnesty items.

Figure 5:
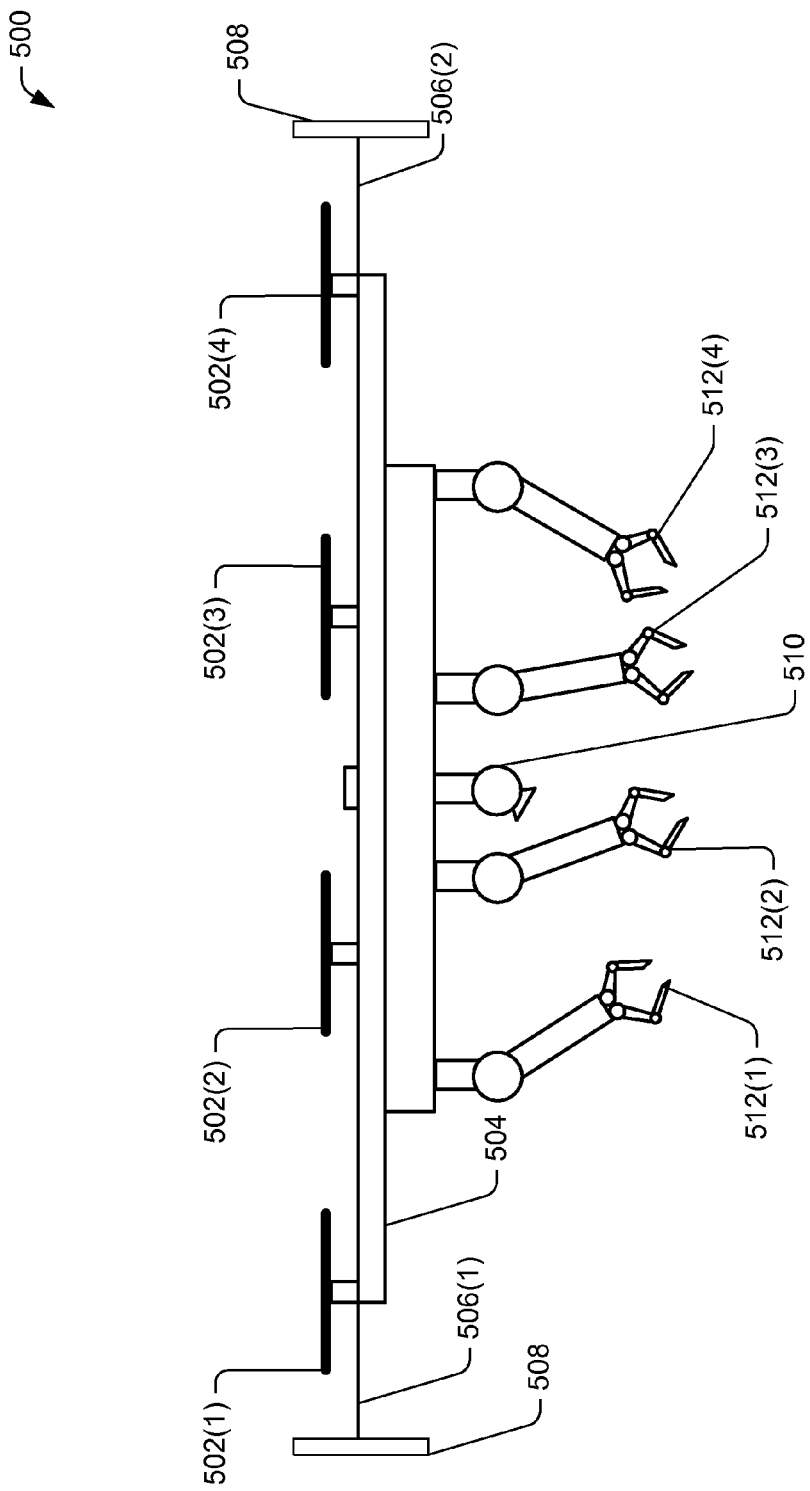
FIG. 5 is a side view of an example automated aerial vehicle used in the inventory system of FIG. 1.

FIG. 5 is a side view of an example AAV 500 used in the inventory system 100 of FIG. 1. In this example, the AAV 400, such as AAV 104(N) of FIG. 1, used to remove amnesty items from the warehouse floor. In this example, the AAV 500 may be a larger than the AAV 400 of FIG. 4 to enable the AAV 500 to engage and carry the amnesty items to the amnesty drop stations. Thus, the AAV 500 is again illustrated with four propellers 502(1), 502(2), 502(3), and 502(4) attached to the frame 504. However, additional propellers may be utilized to provide additional lift for accommodating the extra weight of the amnesty items. In this example, support arms 506(1) and 506(2) extend from the frame 504 at one end and connected to a barrier 508 at the other, as described above with respect to FIG. 3.

In some implementations, the AAV 500 may include one or more imaging components 510, as described above with respect to FIG. 4, to identify the amnesty items and for engaging or securing the amnesty items. For instance, the imaging components 510 may be utilized to identify a type of amnesty item present, such that the AAV 500 may utilize an appropriate engagement mechanism to secure the amnesty item prior to removal from the warehouse floor.

The AAV 500 also includes one or more engagement mechanisms 512(1)-(4). In the illustrated example, each of the engagement mechanisms 512(1)-(4) are the same, however, in some cases, each may be designed for a particular type of amnesty items, such as one mechanism for paper and plastic, one mechanism for shrink wrapped items, one mechanism for boxes, etc. Additionally, while the engagement mechanisms 512(1)-(4) are illustrated as mechanical arms with gripper claws, the engagement mechanisms 512(1)-(4) may include vacuum or suction devices, a box or retainer area with a ramp or doors configure to trap the amnesty items, or one or more buckets, among others. Further, in some implementations, more than the four engagement mechanisms 512(1)-(4) may be utilized to trap, secure, or otherwise engage the amnesty items.

For example, the engagement mechanisms 512(1)-(4) may be configured to engage and disengage items, containers, packaging materials, boxes, packaged items, or shipping crates. In this example, the engagement mechanisms 512(1)-(4) may be positioned within a cavity of the frame 404 or the engagement mechanisms 512(1)-(4) may be positioned beneath the AAV 500 as shown. In implementations, the engagement mechanisms 512(1)-(4) may each be positioned in a different cavity within the frame 504.

In some cases, the inventory system 100 of FIG. 1 may employ multiple AAVs each having different types of engagement mechanisms for removing different types of amnesty items from the warehouse floor. For example, in some cases, the AAV 500 may have only a single engagement mechanism to reduce the overall weight of the AAV 500 and/or to keep the AAV 500 below a weight threshold required for takeoff.

Figure 6:
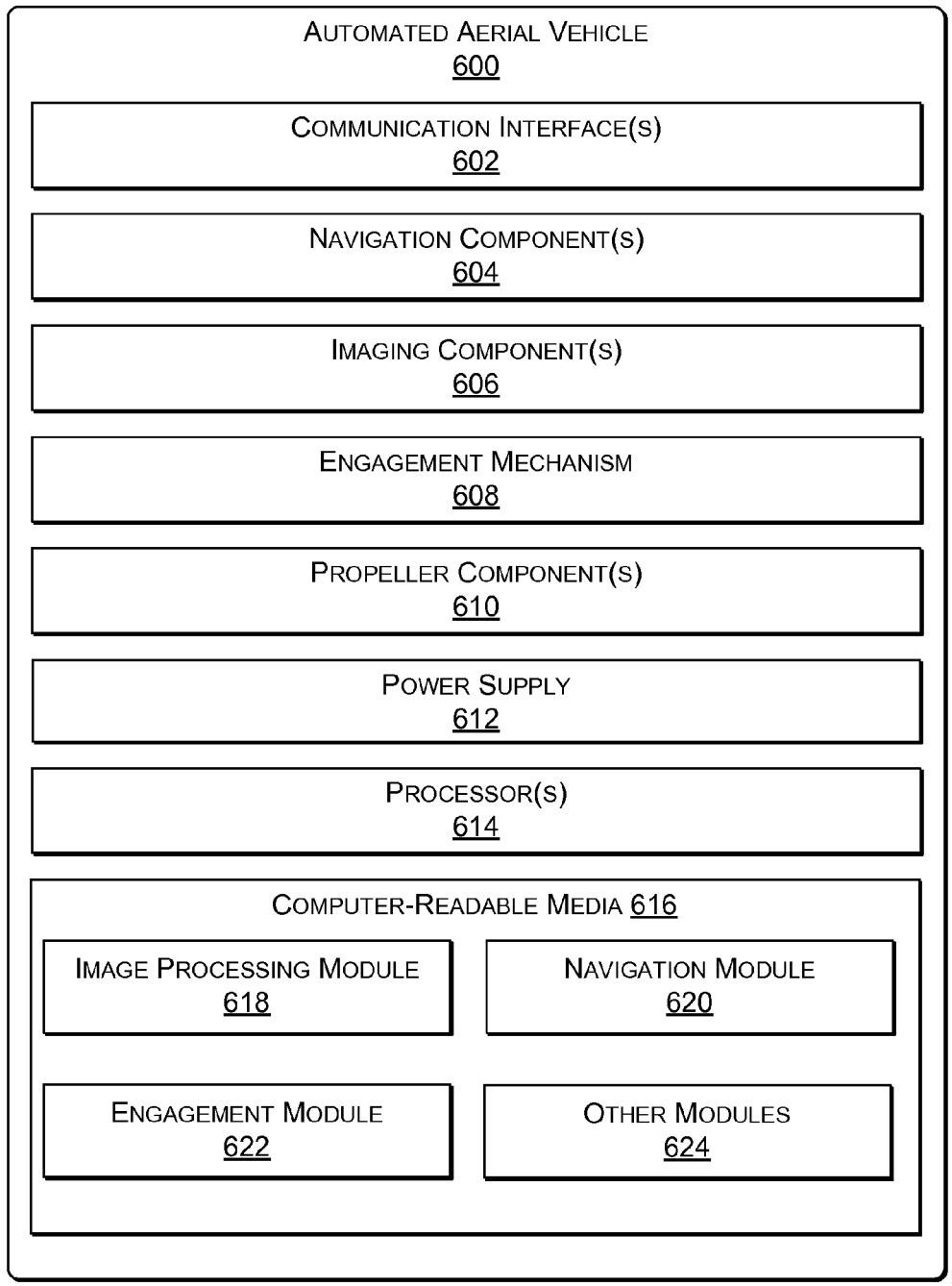
FIG. 6 illustrates an example architecture of an automated aerial vehicle of FIGS. 1-5.

FIG. 6 illustrates an example architecture of an AAV 600 of FIGS. 1-3. In various examples, the architecture may be illustrative of one or more aspects of the AAV 600 that may be used to implement AAVs for use in the inventory systems 100, 200, 300 described above. In some cases, the AAV 600 may be implemented as a standalone device that is configured to identify and retrieve amnesty items from a warehouse floor and/or delivering packages. In other cases, the AAV 600 may be configured to communicate with one or more management modules to coordinate the removal of amnesty items and/or the delivery of the packages.

Thus, in some implementations, the AAV 600 may include one or more communication interfaces 602 to facilitate communication and/or data transfer (such as image data collected by the AAV 600) between one or more networks and/or one or more management modules (such as the management module 116 of FIG. 1 or the management module 220 of FIG. 2). In some cases, the communication interfaces 602 may also facilitate communication between one or more wireless access points, a master device and/or one or more other computing devices as part of an ad-hoc or home network system. For example, the communication interfaces 602 may support wireless connection, such as radio, WiFi, short-range or near-field networks, infrared signals, and so forth.

The AAV 600 may also include navigation components 604 for traversing the warehouse and/or for delivering packages to the end customer or a relay station. In some implementations, the navigation system 604 may include a GPS or other similar system that may be used to navigate the AAV 600 to and/or from a location. In other implementations, the navigation system 604 may include one or more sensors or cameras for detecting objects (such as shelving, MDUs, and/or other AAVs) within a warehouse to aid in circumventing the objects during flight.

In addition to the navigation components 604, the AAV 600 may also include one or more imaging components 606. For example, the imaging component 606 may be configured to capture images of the warehouse floor that may processed in order to detect amnesty items. For instance, the imaging component 606 may be configured to image a scene or area of the warehouse floor in the visible light wavelengths, non-visible light wavelengths, or both. In some cases, the imaging component 606 may have a field of view that may be fixed, while in other cases the field of view may be movable and/or zoomable.

In some cases, a plurality of imaging component 606 may be used to monitor the warehouse floor. For example, the AAV 600 may include a three-dimensional camera, an infrared camera, and/or a red-green-blue camera. In one example, the three-dimensional and infrared camera may be configured to capture information related to depths, location, and movement of objects within the field of view. The red-green-blue camera may be configured to detect edges of objects by identifying changes in color within the field of view. In some cases, the AAV 600 may also include additional imaging components 606 for tracking the movement of amnesty items within the field of view. For example, the AAV may include one or more motion sensors.

The AAV 600 may also be equipped with one or more engagement mechanisms 608 for securing objects (e.g., packages or amnesty items) to the AAV 600 during flight. For instance, the AAV 600 may be equipped one or more arms with gripper claws for engaging and securing items, such as packaging materials. In other instances, the AAV 600 may be equipped with a vacuum device for suctioning fallen merchandise, such as a DVDs, and/or a padded bucket designed to pick up fallen merchandise, such as a stuffed animals or dolls. In some implementations, the engagement mechanism 608 may be configured work in conjunction with specially designed shipping containers. For example, the engagement mechanism 608 may be designed to lock into place via a magnetic or mechanical coupling when positioned correctly with respect to a shipping container.

The AAV 600 also includes propeller components 610 for providing lift to maintain flight. For example, the propeller components 610 may include one or more propellers, as well as one or more propeller motors. The AAV 600 may also include one or more power supplies 610 for powering the other components, such as the propeller motors.

The AAV 600 includes, or accesses, components such as at least one control logic circuit, central processing unit, one or more processors 614, in addition to one or more computer-readable media 616 to perform the function of controlling the AAV 600. Additionally, each of the processors 614 may itself comprise one or more processors or processing cores.

Depending on the configuration of the AAV 600, the computer-readable media 616 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 614.

Several modules such as instruction, data stores, and so forth may be stored within the computer-readable media 616 and configured to execute on the processors 614. Image processing module 618 may be configured to process the image data collected by the image components 606 in order to identify amnesty items and/or ready to ship packages located within the warehouse. For example, the image-processing module 618 may be configured to process the image data to detect contrasts with the warehouse floor and/or projections from the warehouse floor to identify out of place objects.

A navigation module 620 may be stored in the computer-readable media 616 and configured to process data generated by the navigation components 604 when executed by the one or more processors 614. For example, the navigation module 620 may analyze sensor data and GPS data and, based at least in part on the sensor data and the GPS data, generate course corrections to prevent the AAV 600 from bumping objects during flight.

An engagement module 622 may also be stored in the computer-readable media 616 and excitable by the one or more processors 614. The engagement module 622 may be configured to process the image data, for instance, to aid in the alignment of the engagement mechanisms 608 with the amnesty item or package to properly secure the amnesty item or package to the AAV 600. In some implementations, the engagement module 622 may aid in the selection of an appropriate engagement mechanism 608 for engaging the amnesty item or package.

In some cases, the AAV 600 may also include one or more other modules for assisting in the retrieval and removal of amnesty items from a warehouse floor and/or with regard to delivery of packages to customers. For example, one or more operating systems may be stored within the computer-readable media 616.

Figure 7:
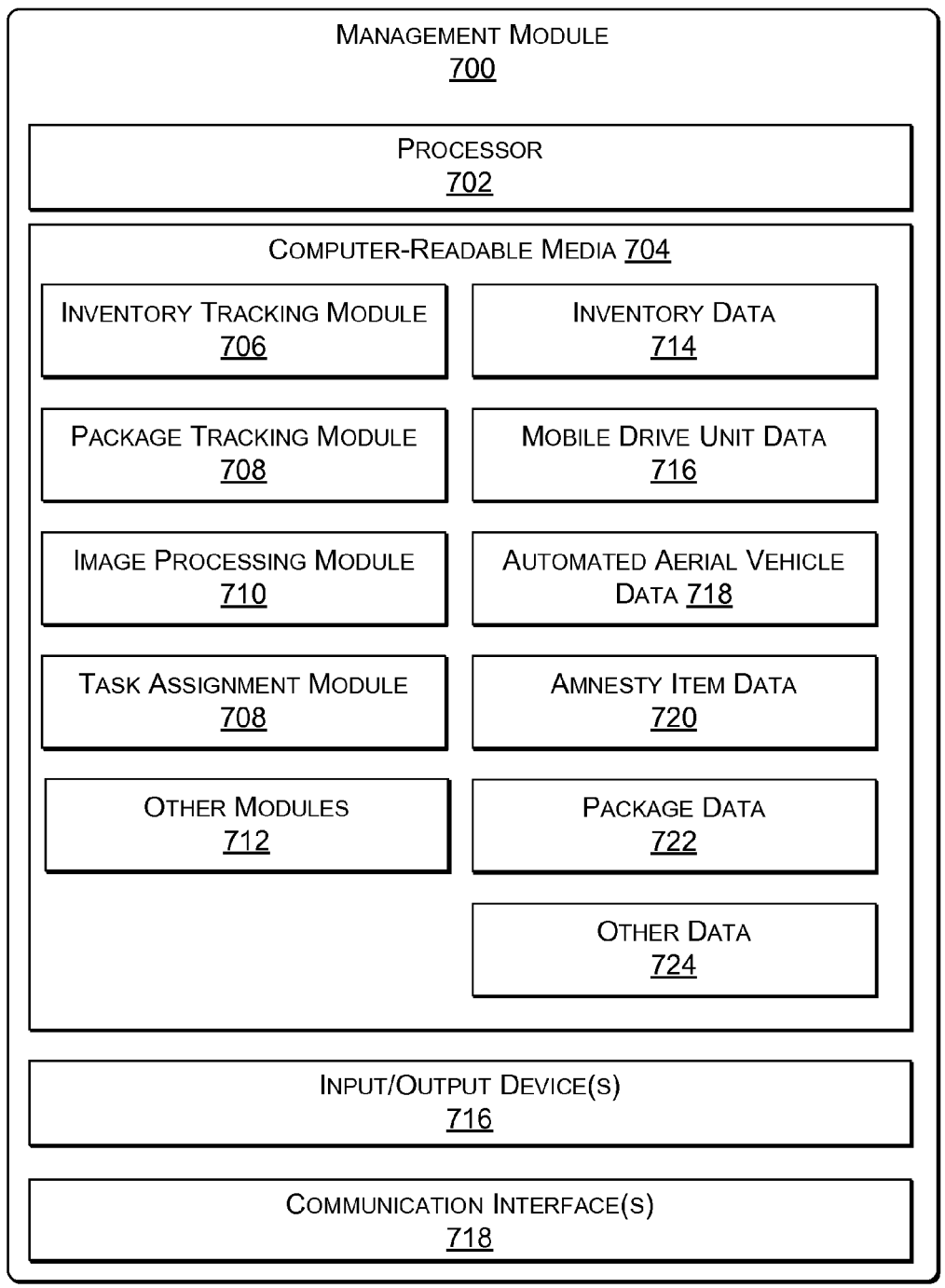
FIG. 7 illustrates an example architecture of a management module of FIGS. 1 and 2.

FIG. 7 illustrates an example architecture of a management module 700. In general, one or more management modules 700 may be incorporated into an inventory system, such as inventory system 100 of FIG. 1, for assigning tasks to the MDUs and/or the AAVs associated with the inventory system. In some cases, the management module 700 may include, or access, components such as at least one control logic circuit, central processing unit, one or more processors 702, in addition to one or more computer-readable media 704 to perform the function of routing inventory, controlling the MDUS and the AAVs, and supervising the removal of amnesty items within the warehouse. Additionally, each of the processors 702 may itself comprise one or more processors or processing cores.

Depending on the configuration of the management module 700, the computer-readable media 704 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 702.

Several modules such as instruction, data stores, and so forth may be stored within the computer-readable media 704 and configured to execute on the processors 702. For example, an inventory tracking module 706 may be configured to tack or monitor the physical location of the inventory stored within the warehouse (e.g., on an inventory holder, at a particular inventory station, etc.). A package tracking module 708 may be configured to tack or monitor the physical location of the ready to ship packages within the warehouse (e.g., on an inventory holder, at a particular pickup area, onboard a particular AAV, etc.). An image-processing module 610 may be configured to process image data collected by AAVs monitoring the warehouse floor in order to identify amnesty items and/or ready to ship packages located within the warehouse. A task assignment module 712 for assigning tasks to the MDUs and the AAVs associated with the inventory system. In some cases, the computer-readable media 704 may also store one or more other modules 712 for managing the inventory system. For example, one or more operating systems may be stored within the computer-readable media 704.

The computer-readable media 704 may also store data, data structures, and the like that are used by the functional components. For example, data stored by the computer-readable media 704 may include the inventory data 714, the MDU data 716, AAV data 718, amnesty item data 720, and package data 722. For example, the inventory data 714, the MDU data 716, the AAV data 718, the amnesty item data 720, and the package data 722 may include a location of each items, package, MDU, or AAV within the warehouse, a state of the item, package, MDU, or AAV (e.g., ready to ship, being packed, in route, etc.), and an assignment or task for each of the items, package, MDUs, or AAVs. The computer-readable media 704 may also store other data 724, which may include, for example, data used by an operating system and the other modules 712. Further, the management module 700 may include many other logical, programmatic and physical components, of which those described are merely examples that are related to the discussion herein.

The management module 700 may also include input/output devices 726 for receiving input from a user, such as an operator or worker, as well as to provide information to the user. For example, the input/output devices 726 may include one or more displays for presenting data to the user as well as one or more haptic input component (e.g., keyboard, keypad, touch screen, joystick, control buttons, etc.) for receiving user inputs.

Figure 8:
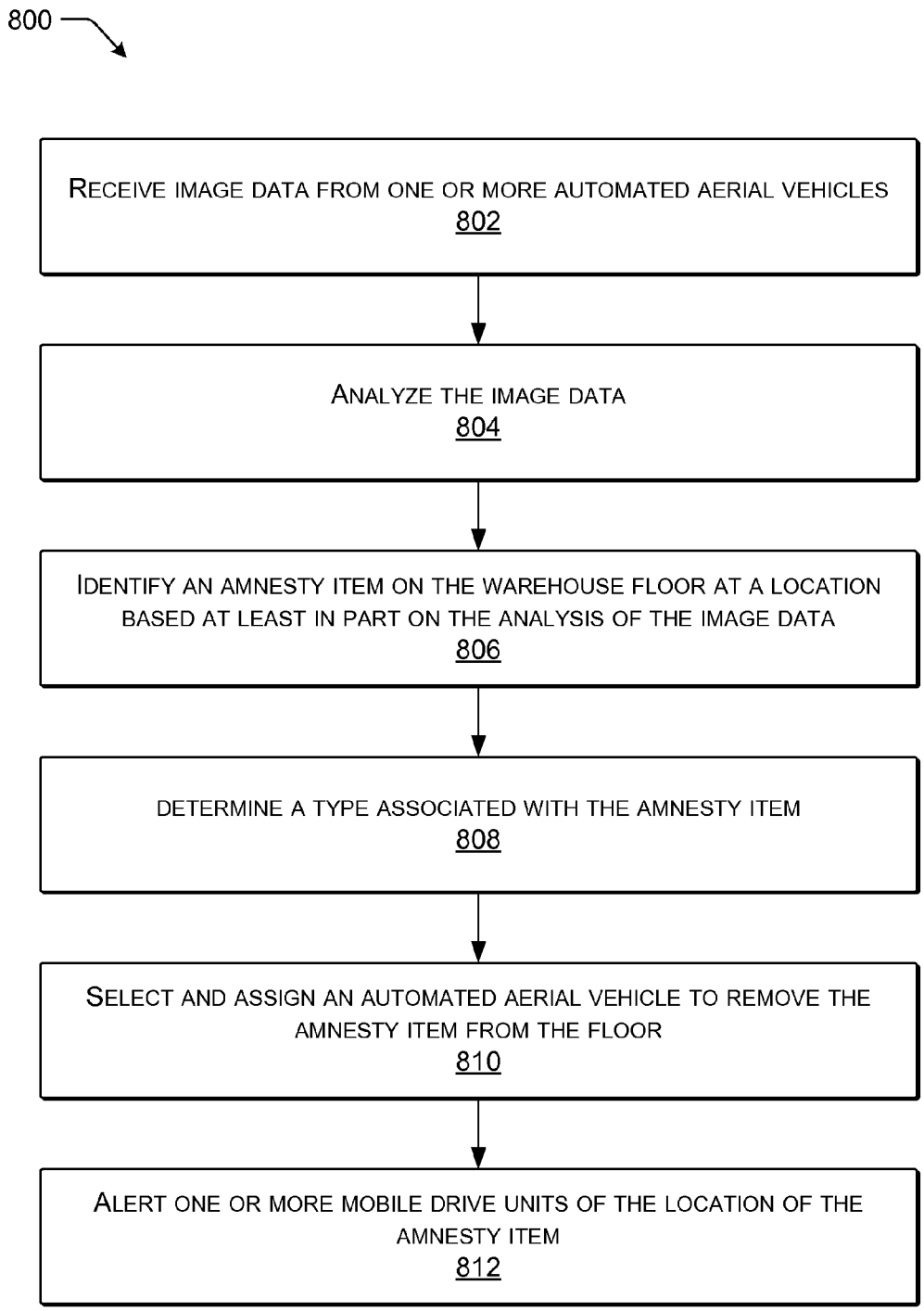
FIG. 8 illustrates an example flow diagram showing an illustrative process performed by the management module of FIGS. 1 and 2.
Figure 9:
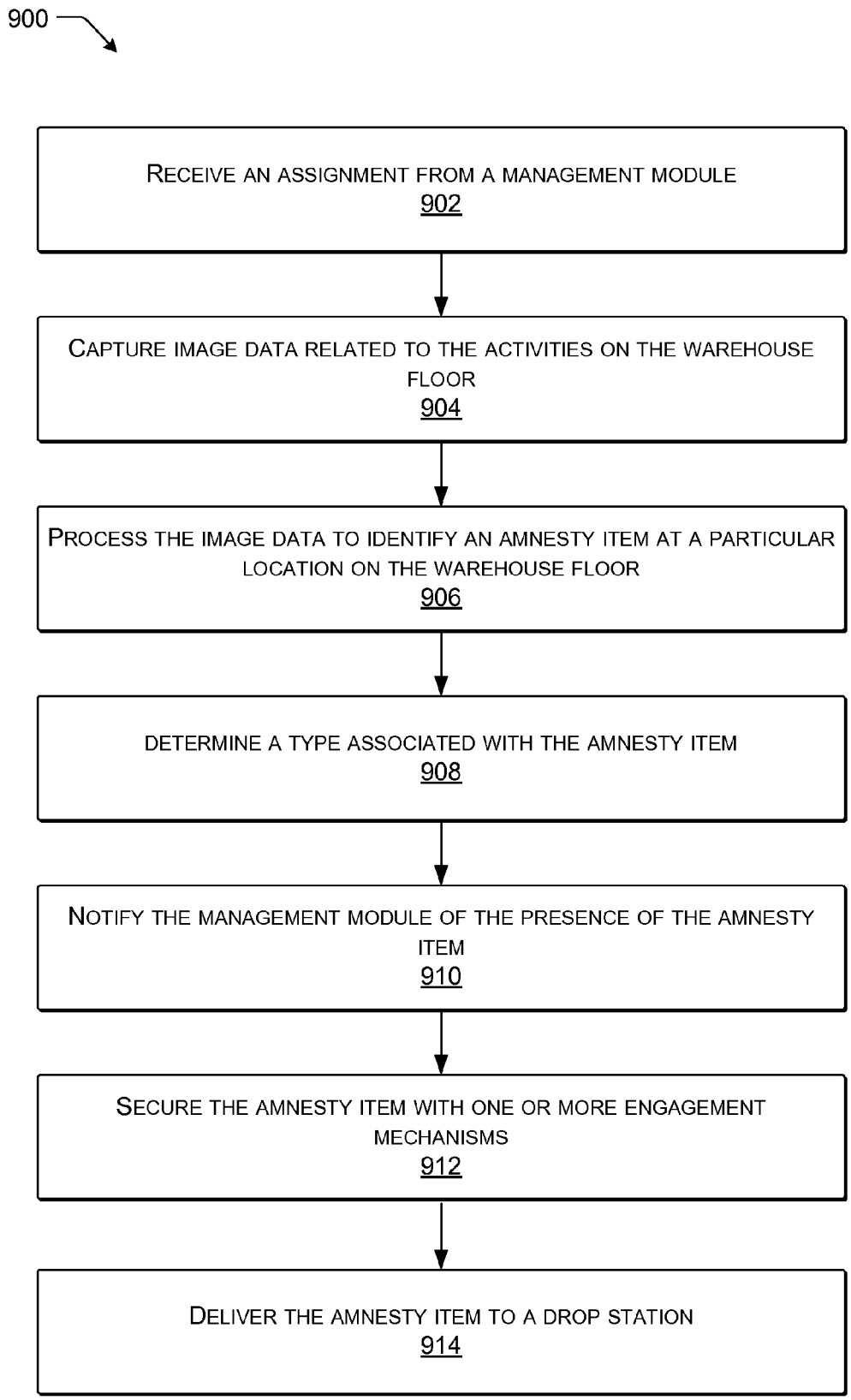
FIG. 9 illustrates an example flow diagram showing an illustrative process performed by the automated aerial vehicle of FIG. 1.

FIGS. 8 and 9 provide example flow diagrams illustrating example processes for implementing the inventory systems of FIGS. 1 and 2. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 8 illustrates an example flow diagram showing an illustrative process 800 performed by a management module, such as management module 116 of FIG. 1 or management module 220 of FIG. 2. For example, the management module may be responsible for assigning tasks, routing MDUs and AAVs through the warehouse, tracking inventory items, etc. In this example, the management module may be configured to communicate with the MDUs and the AAVs to supervise the detection and removal of amnesty items from the warehouse floor.

At 802, the management module receives image data form one or more AAVs. For example, as discussed above with respect to FIG. 1, one or more AAVs may be assigned to fly over the warehouse floor in fixed patterns to capture image data that may be processed to identify amnesty items that may interfere with the operations of the MDUs on the warehouse floor. In some cases, the one or more AAVs may be a first class or smaller class of AAVs that specialize in the capturing of image data, as described above.

At 804, the management module analyzes the image data. In one example, the managed module may execute image recognition software to identify amnesty items present within the captured image data. For instance, the management module may utilize the image data to model the warehouse and compare incoming image data with the model to determine if there is a change greater than a predefined threshold, which may indicate the presence of an amnesty item.

At 806, the management module may identify an amnesty item on the warehouse floor at a location based at least in part on the analysis of the image data. For example, the management module may detect a contrast between the color of the floor and an amnesty item.

At 808, the management module may determine a type associated with the amnesty item. For example, the management module may determine that the amnesty items is packaging material, a fallen inventory item or package, a disabled MDU, etc. In some cases, the management module may also determine or estimate a size and/or weight of the amnesty item to determine if the amnesty item may be removed by AAVs or if an operator or worker should be dispatched.

At 810, the management module selects and assigns an AAV to remove the amnesty item form the floor. For example, as described above, one or more types of retrieval AAVs may be available to remove the amnesty item from the floor. In some cases, the management module may select and assign an AAV to remove the item based in part on the type of engagement mechanism each AAV has equipped. In other cases, the management module may select and assign an AAV to remove the item based in part on the estimated size and/or weight of the amnesty item. In some specific cases, the AAV that provided the image data used to identify the amnesty item may be assigned to remove the amnesty item from the floor.

At 812, the management module may alert one or more MDUs of the location of the amnesty item. For example, the management module may provide instructions to the MDU to avoid the area around the location of the amnesty item to prevent the MDUs from becoming hung up or diverted by the amnesty item. In other examples, the management module may reassign MDUs whose current task requires access to the area around the location of the amnesty item to prevent any slowdown in the output of the inventory system.

FIG. 9 illustrates an example flow diagram showing an illustrative process 900 performed by the AAVs, such as AAVs 104(1)-(4) of FIG. 1.

At 902, an AAV receives an assignment from a management module. For example, the AAV may be assigned a flight path or a particular portion of the warehouse floor. In some implementations, the AAV may be responsible to monitor the activities on the warehouse floor within the assigned area and to determine the presence of items that may disrupt the flow of the inventory system, such as amnesty items.

At 904, the AAV captures image data related to the activities on the warehouse floor. For example, the AAV may be equipped with one or more imaging components, such as one or more cameras, sensors, and/or projectors. In some implementations, the AAV may include three-dimensional cameras, infrared cameras, and/or red-green-blue cameras, as well as mention sensors. In some cases, the AAV may use the imaging components to image a scene or area of the warehouse floor in the visible light wavelengths, non-visible light wavelengths, or both. In some particular implementations, the AAV may utilize a projector to project a pattern onto the warehouse floor. The cameras may then capture image data including the pattern and analyze the pattern to identify any disturbances.

At 906, the AAV may process the image data to identify an amnesty item at a particular location on the warehouse floor. For example, the management module may detect a contrast between the color of the floor and an amnesty item. In other examples, the AAV may detect the amnesty item through other image processing techniques such as structured light, three-dimensional sensing, pulsed light, infra-red photography, among others.

At 908, the AAV may determine a type associated with the amnesty item. For example, the AAV may determine that the amnesty items is packaging material, a fallen inventory item or package, a disabled MDU, etc. In some cases, the AAV may also determine or estimate a size and/or weight of the amnesty item to determine if the amnesty item may be removed by the AAV or if the AAV should request another AAV or an operator via the management module.

At 910, the AAV notifies the management module of the presence of the amnesty item. For example, the AAV may provide the specific location of the amnesty item to the management module so that the management module can direct the MDUs away from the specific location while the AAV retrieves the amnesty item. In some implementations, the AAV may include information related to whether or not the AAV is able to remove the amnesty item from the floor or if the AAV recommends sending a larger AAV, an AAV equipped with a specialized engagement mechanism, and/or an operator or work to remove the amnesty item.

At 912, the AAV secures the amnesty item with one or more engagement mechanisms. For instance, the AAVs may include one or more arms with gripper claws for engaging and securing items, such as packaging materials, as describe with respect to FIG. 5. In other instances, the AAVs may be equipped with a vacuum device for suctioning fallen merchandise, such as a DVDs, and/or a padded bucket designed to pick up fallen merchandise, such as a stuffed animals or dolls. In some cases, the AAV may be equipped with more than one type of engagement mechanism for securing different types of amnesty items.

At 914, the AAV delivers the amnesty item to a drop station. For example, the drop station may represent a location designated for the processing amnesty items misplaced in and retrieved form the storage region of the warehouse. In some cases, the amnesty items may be returned to the amnesty drop station by the AAV, processed by an operator or worker, and then provided to the inventory station or placing back into an appropriate inventory holder.

Figure 10:
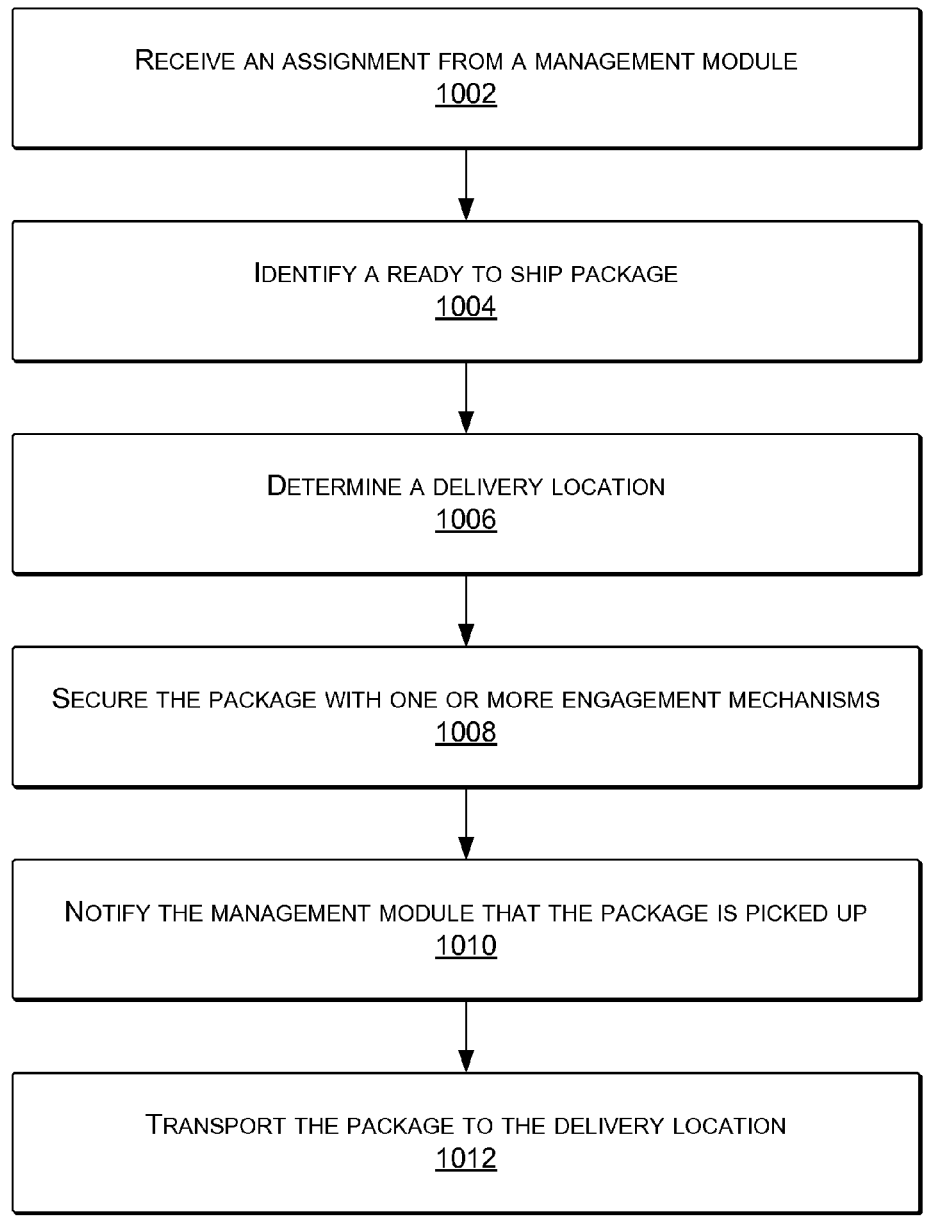
FIG. 10 illustrates an example flow diagram showing an illustrative process performed by the automated aerial vehicle of FIG. 2.

FIG. 10 illustrates an example flow diagram showing an illustrative process 1000 performed by an AAV configured to deliver ready to ship packages. For example, as described above with respect to FIG. 2, packages may be labeled with a bar code or QR code that is identifiable by the AAVs as a package ready to ship. In other cases, the packages placed within predefined pick up areas may be regarded by the AAVs as packages awaiting delivery to an end customer or relay location.

At 1002, the AAV may receive an assignment from a management module. For example, the AAV may be assigned the task of delivering packages or assigned to deliver a particular package. In some cases, the assignment may be based at least in part on a weight, size, and/or shape of the ready to ship package. In other cases, the assignment may be based at least in part on a distance rating associated with particular one of the AAVs (e.g., how far can the AAV travel before recharging).

At 1004, the AAV may identify a ready to ship package. For instance, the AAV may be equipped with one or more imaging comports, such as a scanner, bar code reader, and/or cameras, that may be able to distinguish other inventory items from ready to ship packages and aid the AAV in aligning itself and securing the package for delivery. In one implementation, the AAV may identify the assigned package based at least in part on a location (e.g., at a particular pickup area) and/or based on reading the bar code or QR code. In other implementation, the AAV may scan a particular area such as a designated conveyor belt, as described above with respect to FIG. 2, and to select package for delivery based at least in part on the presence and information associated with the bar code or QR code.

At 1006, the AAV determines a delivery location. In some cases, the AAV may receive delivery location form the management module. In other cases, the, AAV may request delivery location from the management module upon identifying the package. In some particular implementations, the AAV may scan the bar code or QR code to read the delivery information directly off the package itself.

At 1008, the AAV secures the package with one or more engagement mechanisms. For instance, the AAVs may include one or more arms with gripper claws for engaging and securing packages. The AAV may also be equipped with a mechanical or magnetic securing device configured to attach, engage, or lock into place when the AAV is positioned over the package. For instance, a ready to ship package may be placed in a delivery container or AAV container that is configured to magnetically secure or mechanically couple to the underside of the AAV and to release the package at the delivery site.

At 1010, the AAV notifies the management module that the package has been picked up. For example, the AAV may provide one or more notifications that the package has been secured and the AAV is departing to transport the package to the delivery location. In this manner, the management module may update its assignment list and/or allow another package to be routed to the pickup area previously occupied by the secured package.

At 1012, the AAV transports the package to the delivery location. For example, the AAV may transport the package within the warehouse to a delivery truck, to a relay location outside of the warehouse where the package will be routed for final delivery (for instance, by traditional post), and/or directly to the end customer.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An inventory system comprising:
a plurality of mobile drive units (MDU) remotely controllable to transport inventory holders within a storage region;
a search automated aerial vehicle (AAV) and a retrieval AAV to identify and remove amnesty items from the storage region;
at least one management module in wireless communication with the plurality of MDUs, the search AAV, and the retrieval AAV, the at least one management module configured to:
receive image data from the search AAV;
process the image data to identify a location and type of an amnesty item within the storage region; and
provide instructions to the retrieval AAV to remove the amnesty item from the storage region.

2. The inventory system as recited in claim 1, wherein the at least one management module is configured to provide instructions to at least one of the plurality of MDUs to cause the at least one of the plurality of MDUs to maintain a predefined distance from the location.

3. The inventory system as recited in claim 1, wherein the search AAV is configured to track a position of at least one inventory item within the inventory system.

4. The inventory system as recited in claim 1, wherein the retrieval AAV is the search AAV.

5. The inventory system as recited in claim 4, wherein the at least one management module is configured to provide instructions to at least one of the plurality of MDUs to assign a new task for the at least one of the plurality of MDUs based at least in part on the location.

6. An automated aerial vehicle (AAV) comprising:
an image component to collect image data of a physical environment;
a communication interface to communicate with a remote management module;

one or more processors; and a computer-readable media maintaining instructions executable by the one or more processors to cause the AAV to perform operations comprising:

traversing a predefined flight path above the physical environment;

processing the image data captured by the image component as the image data pertains to at least a portion of a warehouse floor; and identifying, based at least in part on the image data, an amnesty item at a location of the warehouse floor.

7. The AAV as recited in claim 6, wherein the computer-readable media maintains instructions executable by the one or more processors to cause the AAV to perform operations comprising providing data related to the amnesty item to the management module via the communication interface.

8. The AAV as recited in claim 7, wherein the data related to the amnesty item comprises the image data.

9. The AAV as recited in claim 7, wherein the data related to the amnesty item comprises the location of the amnesty item on the warehouse floor.

10. The AAV as recited in claim 6, further comprising:

an engagement mechanism for securing the amnesty item to the AAV; and wherein the computer-readable media maintains instructions executable by the one or more processors to cause the AAV to perform operations comprising aligning the AAV with the amnesty item and securing the amnesty item to the AAV with the engagement mechanism.

11. The AAV as recited in claim 6, wherein the computer-readable media maintains instructions executable by the one or more processors to cause the AAV to perform operations comprising delivering the amnesty item to an amnesty drop station.

12. The AAV as recited in claim 6, wherein the computer-readable media maintains instructions executable by the one or more processors to cause the AAV to perform operations comprising altering one or more MDUs of the location of the amnesty item.

13. The AAV as recited in claim 6, wherein the computer-readable media maintains instructions executable by the one or more processors to cause the AAV to perform operations comprising deviating from the predefined flight path to monitor the amnesty item.

14. The AAV as recited in claim 6, wherein the predefined flight path is assigned by the management module.

15. A method comprising:

receiving image data, at a management module, from a search automated aerial vehicle (AAV), the image data related to a state of a storage region of an inventory system;

processing the image data to identify an amnesty item within the storage region;

selecting a retrieval AAV instructing the retrieval AAV to remove the amnesty item from the storage region; and receiving an indication from the retrieval AAV that the amnesty item has been removed.

16. The method as recited in claim 15, wherein the retrieval AAV is selected based at least in part on a type associated with the amnesty item.

17. The method as recited in claim 15, wherein the retrieval AAV is the search AAV.

18. The method as recited in claim 15, wherein the search AAV is associated with a class of AAVs designed for the collection of image data and the retrieval AAV is associated with a class of AAVs equipped with one or more engagement mechanisms.

19. The method as recited in claim 15, further comprising instructions executable by the one or more processors to perform operations comprising alerting one or more mobile drive units (MDUs) of the location of the amnesty item within the inventory system.

20. The method as recited in claim 15, further comprising instructions executable by the one or more processors to perform operations comprising assigning flight paths to the search AAV.

* * * * *